(12) United States Patent
Fujita

(10) Patent No.: US 10,252,744 B2
(45) Date of Patent: Apr. 9, 2019

(54) SYSTEM SHARING BATTERY WITH EXTERNAL DEVICE

(71) Applicant: DENSO CORPORATION, Kariya, Aichi-pref., MN (US)

(72) Inventor: Toshihiro Fujita, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 85 days.

(21) Appl. No.: 15/642,603

(22) Filed: Jul. 6, 2017

(65) Prior Publication Data
US 2018/0009468 A1 Jan. 11, 2018

(30) Foreign Application Priority Data

Jul. 7, 2016 (JP) .................. 2016-135017

(51) Int. Cl.
*B62D 5/04* (2006.01)
*H02J 7/00* (2006.01)
*H02J 7/34* (2006.01)
*H02P 6/16* (2016.01)
*F02N 11/08* (2006.01)
*F02N 11/10* (2006.01)
*B60R 16/033* (2006.01)

(52) U.S. Cl.
CPC .......... *B62D 5/0481* (2013.01); *B60R 16/033* (2013.01); *B62D 5/0463* (2013.01); *F02N 11/0862* (2013.01); *F02N 11/108* (2013.01); *H02J 7/0047* (2013.01); *H02J 7/0068* (2013.01); *H02P 6/16* (2013.01); *H02J 7/345* (2013.01)

(58) Field of Classification Search
CPC .. B62D 5/0481; B62D 5/0463; B60R 16/033; F02N 11/0862; F02N 11/108; H02J 7/0047; H02J 7/0068; H02P 6/16; H02P 7/345
See application file for complete search history.

(56) References Cited

U.S. PATENT DOCUMENTS

| 9,908,555 | B2 * | 3/2018 | Ogasawara | ............ B62D 5/008 |
| 10,029,572 | B2 * | 7/2018 | Sakatani | ............... B60R 16/033 |
| 2008/0106237 | A1 * | 5/2008 | Lafontaine | .............. H02J 5/005 320/166 |

(Continued)

*Primary Examiner* — Nicholas Kiswanto
(74) *Attorney, Agent, or Firm* — Knobbe, Martens, Olson & Bear, LLP

(57) ABSTRACT

In a system that shares a battery with an external device, the system includes a power storage device connected to the battery via a power supply line. The system includes a switch provided on the power supply line, and a control unit. The control unit controls on-off switching operations of the switch to selectively establish an electrical conduction between the battery and the power storage device or interrupt the electrical conduction therebetween. The battery has a battery voltage thereacross, and the power storage device has a power-storage voltage thereacross. The battery charges the power storage device while the electrical conduction is established so that the power-storage voltage follows the battery voltage. The control unit turns off the switch when the battery voltage is in a predetermined insufficient voltage state to prevent electrical power charged in the power storage device from being discharged to the battery.

13 Claims, 9 Drawing Sheets

(56) References Cited

U.S. PATENT DOCUMENTS

| | | | | |
|---|---|---|---|---|
| 2009/0315401 A1* | 12/2009 | Yoshida | ............... | H02J 9/061 |
| | | | | 307/44 |
| 2013/0320931 A1* | 12/2013 | Yoshida | ............... | B60R 16/033 |
| | | | | 320/135 |
| 2015/0239496 A1 | 8/2015 | Kozawa et al. | | |
| 2015/0239501 A1 | 8/2015 | Fujita et al. | | |
| 2017/0297433 A1* | 10/2017 | Shibachi | ............... | B60L 3/0092 |
| 2018/0093698 A1* | 4/2018 | Urimoto | ............... | H02K 11/21 |

* cited by examiner

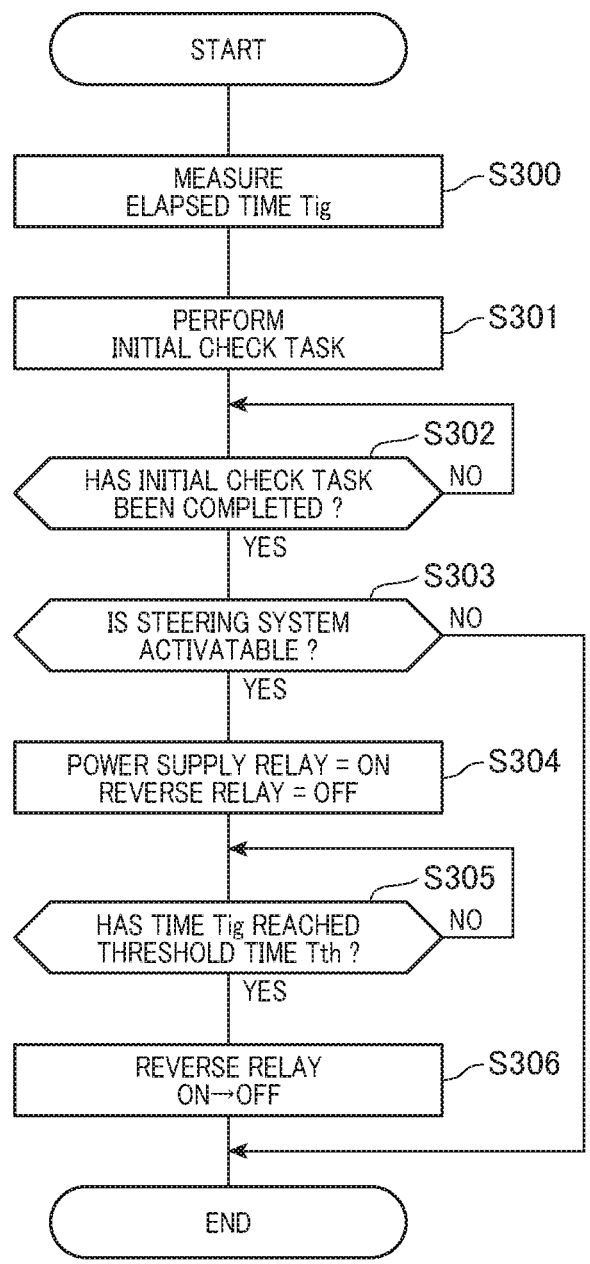

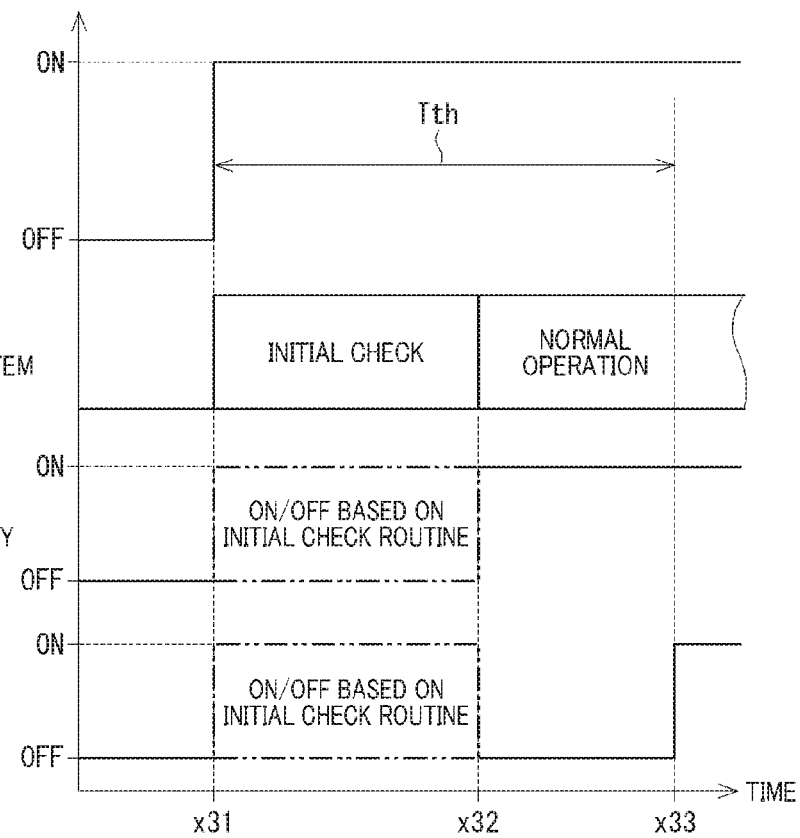

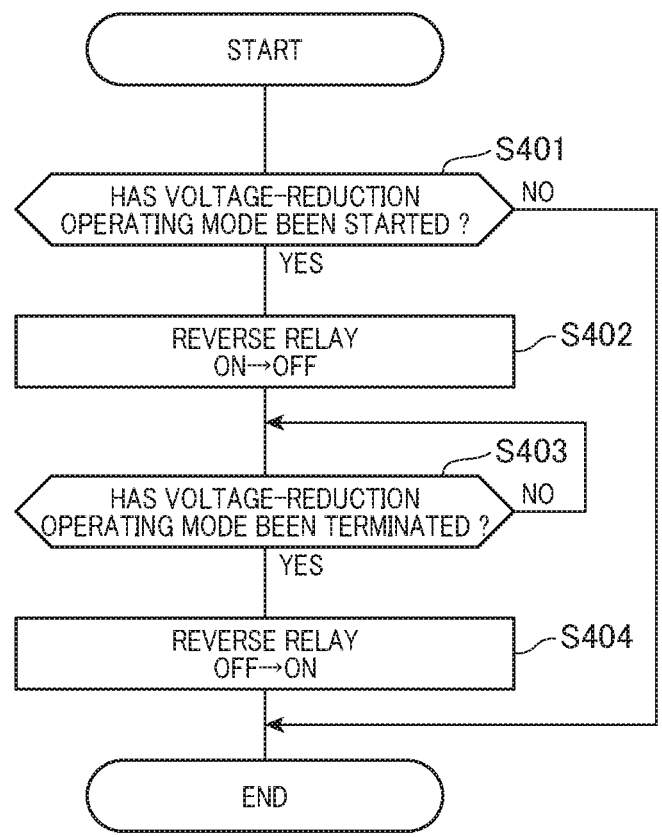

SYSTEM SHARING BATTERY WITH EXTERNAL DEVICE

CROSS REFERENCE TO RELATED APPLICATIONS

This application is based on and claims the benefit of priority from Japanese Patent Application 2016-135017 filed on Jul. 7, 2016, the disclosure of which is incorporated in its entirety herein by reference.

TECHNICAL FIELD

The present disclosure relates to systems that share a battery with an external device.

BACKGROUND

Electric power steering systems are known as an example of vehicular systems, i.e. in-vehicle systems. Such an electric power steering system is configured to assist a driver's turning effort of a steering wheel. For example, Japanese Patent Application Publication 2015-161584, referred to as a published patent document, discloses a typical one of these known electric power steering systems.

Specifically, the published patent document discloses an electric power steering system including a motor that generates torque for assisting a driver's turning effort of a steering wheel. The electric power steering system also includes a rotation detector for detecting the rotational angle of the motor. In particular, the rotation detector continuously operates based on electrical power supplied from a battery to perform a predetermined function even if an ignition power supply is off, i.e. an ignition switch is off.

SUMMARY

Such a vehicular system serves as a system that shares a battery with other external components. For example, if a starter and such a rotation detector share a battery, the voltage output from the battery may rapidly decrease due to the starter being driven. This may result in other components, which use the electrical power output from the battery, failing to perform their operations.

In view of the circumstances, a first aspect of the present disclosure seeks to provide systems that share a battery with an external device, each of which is capable of addressing the problem set forth above.

Specifically, a second aspect of the present disclosure seeks to provide such battery-sharing systems, each of which enables at least one component to continuously perform its operations even if the voltage across a battery has decreased.

According to an exemplary aspect of the present disclosure, there is provided a system that shares a battery with an external device. The system includes a power storage device connected to the battery via a power supply line, a switch provided on the power supply line, and a control unit. The control unit is configured to control on-off switching operations of the switch to selectively establish an electrical conduction between the battery and the power storage device or interrupt the electrical conduction therebetween. The battery has a battery voltage thereacross, and the power storage device has a power-storage voltage thereacross. The battery charges the power storage device while the electrical conduction is established so that the power-storage voltage follows the battery voltage. The control unit is configured to turn off the switch when the battery voltage is in a predetermined insufficient voltage state to prevent electrical power charged in the power storage device from being discharged to the battery.

The exemplary aspect of the present disclosure makes it possible to prevent electrical power charged in the power storage device from being discharged to the battery even if the battery voltage is in the predetermined insufficient voltage state. This configuration limits the decrease of the power-storage voltage. In addition, this configuration enables the power storage device to supply operating power to one or more electrical loads provided in the system. This enables the one or more electrical loads to continuously perform their corresponding functions even if the battery voltage is in the predetermined insufficient voltage state.

BRIEF DESCRIPTION OF THE DRAWINGS

Other aspects of the present disclosure will become apparent from the following description of embodiments with reference to the accompanying drawings in which:

FIG. 7 is a flowchart schematically illustrating a relay control routine according to the third embodiment of the present disclosure;

FIGS. 8A to 8D are a joint timing chart schematically illustrating an example of how the electric power steering system according to the third embodiment operates while a microcomputer of the system executes the relay control routine illustrated in FIG. 7; and FIG. 9 is a flowchart schematically illustrating a relay control routine according to the fourth embodiment of the present disclosure.

DETAILED DESCRIPTION OF EMBODIMENT

Figure 1:
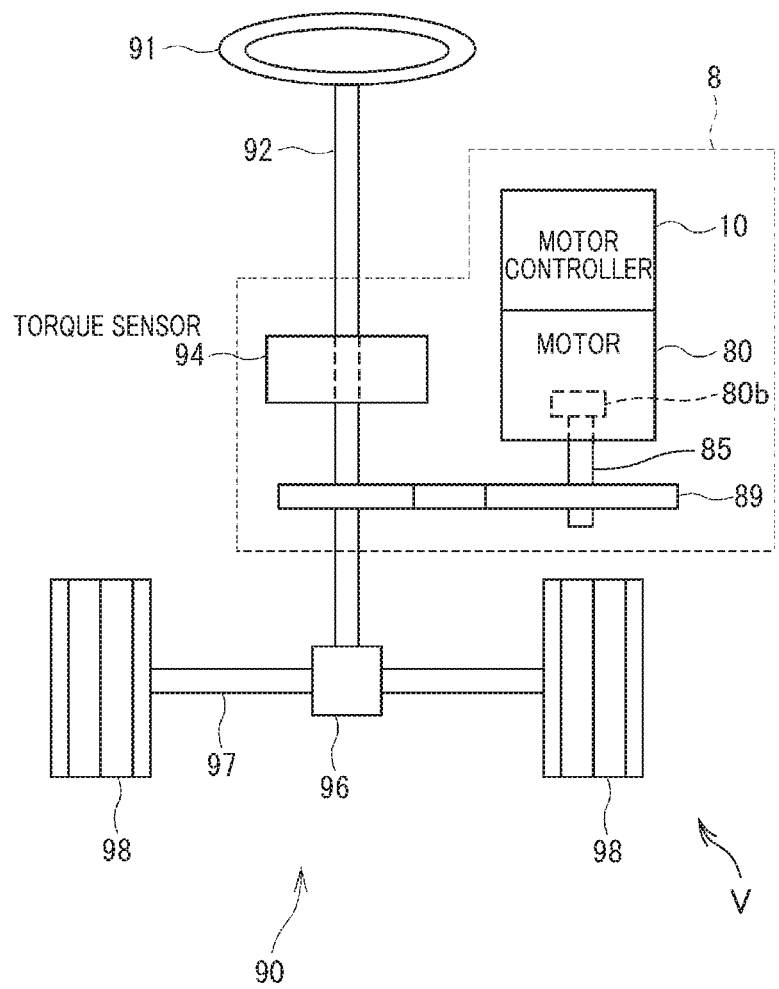
FIG. 1 is a structural diagram schematically illustrating an electric power steering system according to the first embodiment of the present disclosure.

The following describes preferred embodiments of the present disclosure with reference to the accompanying drawings. In the embodiments, like parts between the embodiments, to which like reference characters are assigned, are omitted or simplified to avoid redundant description.

First Embodiment

The following describes the first embodiment of the present disclosure with reference to FIGS. 1 to 11.

Referring to FIG. 1, an electric power steering system 8 according to the first embodiment is installed in, for example, a steering system 90; the steering system 90 is installed in a vehicle V. The electric power steering system 8 is operative to assist a driver's steering operation of a steering wheel 91 of the vehicle V.

The steering system 90 includes, for example, the steering wheel 91 as a driver's operation member, a steering shaft 92, a torque sensor 94, a pinion gear 96, a rack and axle 97, wheels 98, and the electric power steering system 8.

The steering shaft 92 is comprised of, for example, a first portion, i.e. an upper portion, 92a and a second portion, i.e. a lower portion, 92b. Each of the first and second portions 92a and 92b of the steering shaft 92 also has opposing first and second ends.

The steering wheel 91 is connected to the first end of the first portion 92a of the steering shaft 92. The torque sensor 94 is mounted to the steering shaft 92; the torque sensor 94 is operative to measure torque based on a driver's steering operation of the steering shaft 92 as steering torque, and output a measurement signal indicative of the measured torque. The torque sensor 94 includes a torsion bar 94a having opposing first and second ends. The second end of the first portion 92a of the steering shaft 92 is coaxially connected to the first end of the torsion bar 94a, and the second end of the torsion bar 94a is coaxially connected to the first end of the second portion 92b of the steering shaft 92. The pinion gear 96 is mounted to the second end of the second portion 92b of the steering shaft 92.

The torque sensor 94 measures the twist of the torsion bar 94a based on a driver's steering operation of the steering shaft 92 as steering torque.

The rack and axle 97 includes a rod-shaped rack with which the pinion gear 96 is engaged. The rack and axle 97 also includes tie rods each having opposing first and second ends. The first end of each of the tie rods is coupled to a corresponding one of both ends of the rod-shaped rack. One of the wheels 98 is mounted to the second end of a corresponding one of the tie rods, and the other of the wheels 98 is also mounted to the second end of a corresponding one of the tie rods.

Driver's turning of the steering wheel 91 causes the steering shaft 92 coupled to the steering wheel 91 to turn. This rotary motion, i.e. torque, of the steering shaft 92 is transformed to linear motion of the rack of the rack and axle 97. This linear motion of the rack of the rack and axle 97 causes the wheels 98 to steer via the respective tie rods. The steering angle of each of the wheels 98 is determined based on the axial displacement of the rack of the rack and axle 97.

Figure 2:
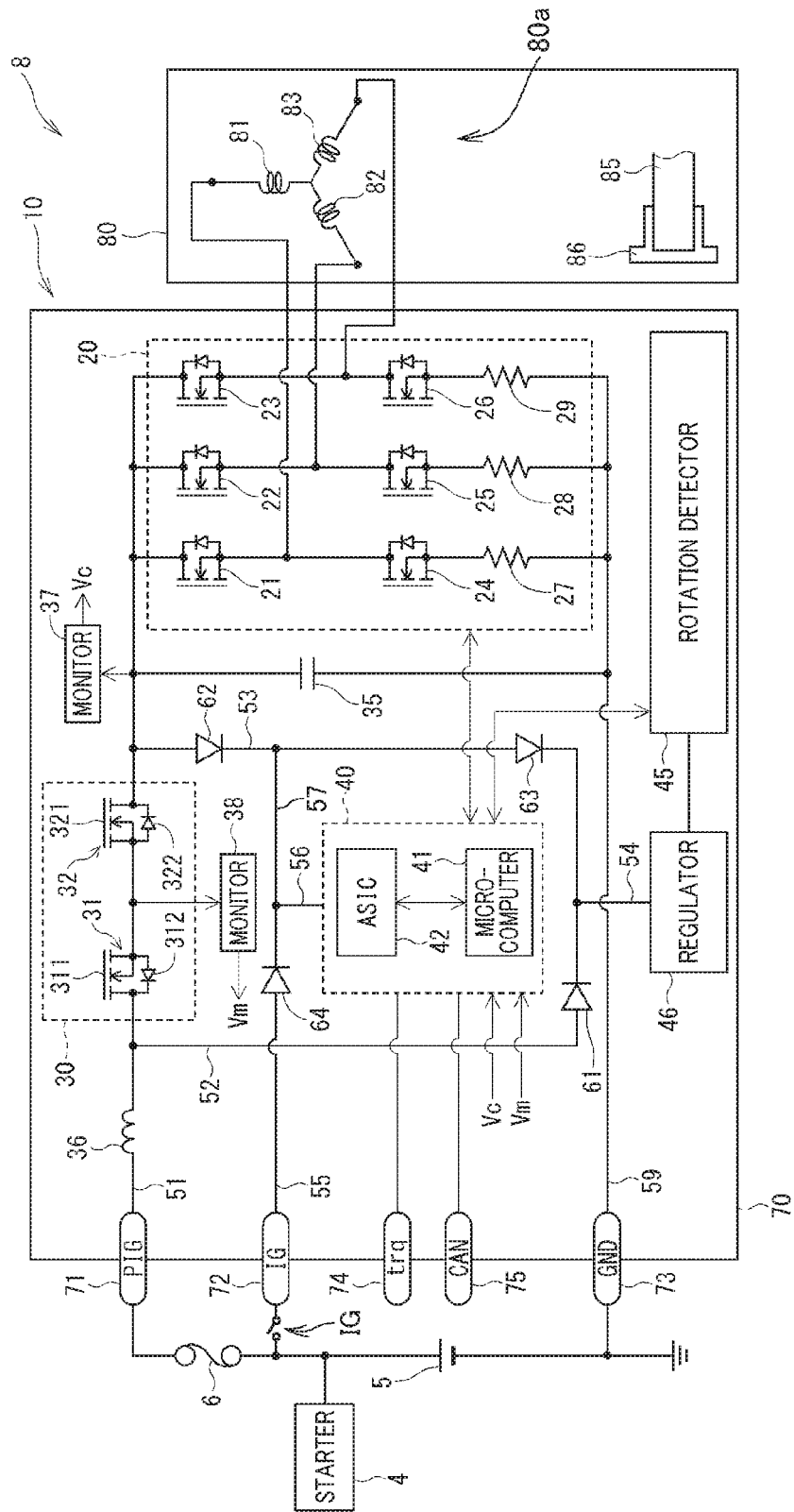
FIG. 2 is a circuit diagram schematically illustrating an example of the overall circuit structure of the electric power steering system illustrated in FIG. 1.

Referring to FIGS. 1 and 2, the electric power steering system 8 includes, for example, a motor 80 with a shaft 80a, a deceleration gear mechanism 89 serving as, for example, a power transfer mechanism, the torque sensor 94, and a motor controller 10. In FIG. 2, the deceleration gear mechanism 89 and torque sensor 94 are omitted from illustration.

The deceleration gear mechanism 89 includes, for example, a first gear coupled to the shaft 80a of the motor 80, and a second gear engaged with the first gear and mounted to the steering shaft 92. For example, the deceleration gear mechanism 89 is operative to transfer assist torque generated based on the turning of the shaft 80a of the motor 80 to the steering shaft 92 while decelerating the rotational speed of the motor 80, i.e. increasing the assist torque generated by the motor 80 by a predetermined gear ratio between the first gear and the second gear.

Specifically, the electric power steering system 8 is configured such that the motor controller 10 causes the motor 80 to generate assist torque based on steering torque measured by the torque sensor 94 and/or vehicle operating condition signals. The vehicle operating condition signals, which include, for example, the speed of the vehicle V, represent the operating conditions of the vehicle V, and are sent from another controller via an in-vehicle network, such as an unillustrated controller area network (CAN).

Specifically, the electric power steering system 8 according to the first embodiment is designed as a shaft assist system for assisting the turning of the steering shaft 92 based on the assist torque generated by the motor 80. The electric power steering system 8 according to the first embodiment can be designed as a rack assist system for assisting the axial displacement of the rack of the rack and axle 97 based on the assist torque generated by the motor 80. That is, the first embodiment is configured such that the steering shaft 92 serves as a target to be assisted, but the rack and axle 97 can serve as a target to be assisted.

The motor 80 is driven based on electrical power, such as a voltage Vb, supplied from a battery 5 (see FIG. 2) to generate assist torque that turns the first gear in a predetermined forward direction or a predetermined reverse direction opposite to the forward direction.

Next, the following describes an example of the electrical configuration of the electric power steering system 8 with reference to FIG. 2.

Referring to FIGS. 1 and 2, the motor 80 is designed as, for example, a three-phase brushless motor comprised of, for example, a stator 80a, a rotor 80b, the shaft 85, and an unillustrated magnetic field member, such as permanent magnets, a field coil, and the like. The stator 80a includes, for example, an unillustrated stator core, and three-phase coils, i.e. U, V, and W-phase coils, 81, 82, and 83. The rotor 80b, to which the shaft 85 is mounted, is configured to be rotatable relative to the stator core together with the shaft 85. The three-phase coils 81, 82, and 83 are wound in, for example, slots of the stator core and around the stator core. The magnetic field member is mounted to the rotor 80b for generating a magnetic field. That is, the motor 80 is capable of rotating the rotor 80b based on magnetic interactions between the magnetic field generated by the magnetic field member of the rotor 80b and a rotating magnetic field generated by the three-phase coils 81, 82, and 83.

Note that currents flowing through the respective U, V, and W-phase coils 81, 82, and 83 will be referred to as phase currents Iu, Iv, and Iw.

The shaft 85 has opposing first and second ends in its axial direction. For example, the first end of the shaft 85 is located to face the motor controller 10. The second end of the shaft 85 serves as an output terminal coupled to the deceleration gear 89 (see FIG. 1). This enables torque generated based on rotation of the rotor assembly, which is comprised of the rotor 80b and the shaft 85, to be transferred to the steering shaft 92 via the deceleration gear 89.

The motor 80 includes a substantially circular plate-like center magnet 86 coaxially mounted to the end surface of the first end of the shaft 85 (see FIGS. 1 and 2).

As illustrated in FIG. 2, the motor controller 10 includes a housing 70, an inverter unit 20, a relay unit 30, a capacitor 35 serving as a power storage device, a coil 36, a first voltage monitor 37, a second voltage monitor 38, a control unit 40, a rotation detector 45, a regulator 46, and diodes 61 to 64. These components 20, 30, 35, 36, 40, 45, 46, and 61 to 64 are accommodated in the housing 70.

FIG. 2 illustrates that the housing 70 of the motor controller 10 is separated from the motor 80, but the motor controller 10 and the motor 80 can at least partially share the housing 70, and therefore the motor controller 10 and the motor 80 can be integrated with each other.

The housing 70 has a PIG terminal 71, an IG terminal 72, a ground terminal 73, a sensor terminal 74, and a communication terminal 75. These terminals 71, 72, 73, 74, and 75 are illustrated in FIG. 2 as the respective reference marks PIG, IG, GND, trq, and CAN.

The vehicle V includes a starter 4 for starting an internal combustion engine (not shown). The starter 4 has a positive terminal connected to the positive terminal of the battery 5, and has a negative terminal connected to the negative terminal of the battery 5. This enables the starter 4 to be driven based on direct-current (DC) power supplied from the battery 5.

The PIG terminal 71 is connected to the positive terminal of the battery 5 via a fuse 6. The fuse 6 is configured to open when an overcurrent higher than a predetermined threshold level flows therethrough.

The IG terminal 72 is connected to the positive terminal of the battery 5 via a start switch as an ignition switch IG. That is, DC power is constantly supplied from the battery 5 to the PIG terminal 71. In contrast, the DC power is supplied from the battery 5 to the IG terminal 72 while the ignition switch IG is on. The ground terminal 73 is connected to the negative terminal of the battery 5 and to a common signal ground of the motor controller 10.

The sensor terminal 74 is connected to the torque sensor 94, and enables signals to communicate between the torque sensor 94 and the control unit 40. For example, the sensor terminal 74 enables the measurement signal output from the torque sensor 94 to be transmitted to the control unit 40.

The communication terminal 75 is connected to an unillustrated in-vehicle network, such as a controller area network (CAN). The communication terminal 75 enables the motor controller 10 to communicate with other devices installed in the vehicle V.

The inverter unit 20 is operative to receive DC power supplied from the battery 5, and convert the DC power into alternating-current (AC) power. Then, the inverter unit 20 is operative to apply the AC power to the three-phase coils 81, 82, and 83.

The inverter unit 20 is comprised of six switches 21 to 26 connected in bridge configuration.

Specifically, the switches 21 and 24 are a pair of U-phase upper- and lower-arm switches connected in series to each other, and the switches 22 and 25 are a pair of V-phase upper- and lower-arm switches connected in series to each other. Additionally, the switches 23 and 26 are a pair of W-phase upper- and lower-arm switches connected in series to each other.

The switches 21 to 26 are for example semiconductor switches, such as metal-oxide-semiconductor field-effect transistors (MOSFETs). The first embodiment uses MOSFETs as the respective switches 21 to 26, but can use other types of switches, such as insulated-gate bipolar transistors (IGBTs), in place of the MOSFETs. That is, one of various types of switches, such as MOSFETs or IGBTs, can be used for each of switches 21 to 26.

The intrinsic diode of each of the switches 21 to 26 comprised of the MOSFETs 21 to 26 can serve as a flywheel diode connected in antiparallel to the corresponding one of the switches 21 to 26. Other flywheel diodes can be connected in antiparallel to the respective switches 21 to 26.

That is, the source of each of the upper-arm switches 21 to 23 is connected to the drain of the corresponding one of the lower-arm switches 24 to 26.

The drains of the switches 21 to 23 are commonly connected to the positive terminal of the battery 5 via the fuse 6, the PIG terminal 71, and a PIG line 51; the relay unit 30 and the coil 36 are mounted on the PIG line 51.

Note that the direction to the battery side on the PIN line 51 will be referred to as an upstream side or upstream direction. Similarly, the direction to the inverter side on the PIN line 51 will be referred to as a downstream side or a downstream direction.

The connection point between the U-phase upper- and lower-arm switches 21 and 24 is connected to a first end of the U-phase coil 81, and the connection point between the V-phase upper- and lower-arm switches 22 and 25 is connected to a first end of the V-phase coil 82. Additionally, the connection point between the W-phase upper- and lower-arm switches 23 and 26 is connected to a first end of the W-phase coil 83. Second ends of the U, V-, and W-phase coils 81, 82, and 83, which are opposite to the first ends, are connected to a common junction, i.e. a neutral point, in, for example, a star-configuration.

The sources of the switches 24 to 26 are respectively connected to first ends of respective current sensor elements 27 to 29. Second ends of the current sensors 27 to 29, which are opposite to their first ends, are connected to the negative terminal of the battery 5 via the common signal ground 59. For example, each of the current sensing elements 27 to 29 is comprised of a shunt resistor. The control unit 40 is operative to measure the phase currents Iu, Iv, and Iw using the respective current sensing elements 27, 28, and 29. This results in the first series connection of the switches 21 and 24 and the current sensing element 27, the second series connection of the switches 22 and 25 and the current sensing element 28, and the third series connection of the switches 23 and 26 and the current sensing element 29 being connected in parallel to the battery 75.

The capacitor 35 is connected between the PIG line 51 and the common signal ground 59 in parallel to each of the first to third series connections of the inverter unit 20.

The control unit 40 measures a voltage drop across each of the current sensing elements 27, 28, and 29, and obtains each of the phase currents Iu, Iv, and Iw based on the measured voltage drop across the corresponding one of the current sensing elements 27, 28, and 29 and the resistance of the corresponding one of the current sensing elements 27, 28, and 29. Other types of current sensing elements, such as Hall elements, can be used as the current sensing elements 27 to 29.

The relay unit 30 includes a power supply relay 31 and a reverse-connection protection relay 32, which serves as, for example, a switch, on the PIG line 51. Specifically, the relay unit 30 is provided on the PIG line 51 at the downstream side relative to the coil 36 and at the upstream side of the connection point to the capacitor 35.

The power supply relay 31 includes a switch 311 and a diode 312 connected thereto with its forward direction being directed toward the PIG terminal 71. For example, the first embodiment uses a MOSFET as the switch 311. The intrinsic diode of the switch 311 comprised of the MOSFET can serve as the diode 312 connected in antiparallel to the switch 311.

Similarly, the reverse-connection protection relay, which will be referred to as a reverse relay, 32 includes a switch 321 and a diode 322 connected thereto with its forward direction being opposite to the forward direction of the diode 312, i.e. being directed toward the capacitor 35. For example, the first embodiment uses a MOSFET as the switch 312. The intrinsic diode of the switch 312 comprised of the MOSFET can serve as the diode 322 connected in antiparallel to the switch 312.

Each of the switches 311 and 312 is connected to, for example, the control unit 40. Under control of the control unit 40, the switches 311 and 312 being in an on state enables power supply to be established between the battery 5 and the inverter unit 20. In contract, under control of the control unit 40, the switches 311 and 312 being in an off state interrupts power supply between the battery 5 and the inverter unit 20.

The switch 321 of the reverse-connection protection relay 32, which is in the off state, represents an interruption state between the battery 5 and the inverter unit 20. The switch 321 of the reverse relay 32, which is in the on state, with the switch 311 being the on state, represents a power supply state between the battery 5 and the inverter unit 20.

Turning on or off the switch 321 of the reverse relay 32 will be referred to as turning on or off the reverse relay 32. Similarly, turning on or off the switch 311 of the power supply relay 31 will be referred to as turning on or off the power supply relay 31.

The relays 31 and 32 are kept off while the ignition switch IG is kept off, and the relays 31 and 32 are turned on when the ignition switch IG is turned on.

The diode 312 of the power supply relay 31 enables a current to flow from the downstream to the upstream thereof, and the diode 322 of the reverse relay 32 enables a current to flow through the upstream to the downstream thereof.

That is, the diode 312 would prevent a current from flowing from the downstream to the upstream thereof if the battery 5 were reversely connected to the PIG terminal 71 and to the ground terminal 73.

While the reverse relay 32 is in the on state, the capacitor 35 is operative to store therein electrical power, i.e. electrical charge, based on, for example, the DC power supplied from the battery 5 for assisting power supply to the inverter unit 20. The electrical charge stored in the capacitor 35 can be supplied as DC power to the rotation detector 45 and to the control unit 40 if the voltage Vb of the battery 5, referred to simply as a battery voltage Vb, decreases. In particular, the voltage across the capacitor 35, referred to as a capacitor voltage Vc, follows the battery voltage Vb while the switch 321 is on.

The coil 36 is mounted on the PIG line 51 at the upstream of the relay unit 30. The capacitor 35 and the coil 36 constitute a filter circuit that reduces noise transferred from other devices sharing the battery 5, and also reduces noise transferred from the motor controller 10 to the other devices sharing the battery 5.

The first voltage monitor 37 is operative to monitor the capacitor voltage Vc across the capacitor 35, and to send the monitored capacitor voltage Vc to the control unit 40.

The second voltage monitor 38 is operative to monitor an intermediate voltage Vm at a point on the PIG line 51; the point is located between the power supply relay 31 and the reverse relay 32. The second voltage monitor 38 is also operative to send the monitored intermediate voltage Vm to the control unit 40. The capacitor voltage Vc corresponds to, for example, a voltage across a power storage device, and the intermediate voltage Vm corresponds to, for example, an upstream voltage.

The control unit 40 is comprised of a microcomputer 41 and an integrated circuit 42 communicably connected to each other. For example, an application specific integrated circuit (ASIC) is used as the integrated circuit 42 as illustrated in FIG. 2.

The microcomputer 41, which is comprised of, for example, a CPU and a memory unit including a ROM and a RAM, is communicably connected to the switches 21 to 26, the current sensing elements 27 to 29, the torque sensor 94, the first and second voltage monitors 37 and 38, the switches 311 and 321, and the rotation detector 45.

The microcomputer 41 is configured to perform various control tasks including a task to generate control signals that control on-off switching operations of the respective switches 21 to 26 and 311 and 312 based on at least one of 1. The measurement signal output from the torque sensor 94
2. The voltage drops measured by the respective current sensing elements 27 to 29
3. A measurement signal output from the rotation detector 45
4. The capacitor voltage Vc across the capacitor 35
5. The intermediate voltage Vm at the point on the PIG line 71 between the power supply relay 31 and the reverse relay 32.

The on-off switching operations of the switches 21 to 26 enable the DC power supplied from the battery 5 to be converted into AC power, thus driving the motor 80 based on the AC power.

The microcomputer 41 is configured to perform the various tasks using information sent from the other devices installed in the vehicle V, and output, to at least one of the other devices, information indicative of the electric power-steering system 8.

For example, the CPU of the microcomputer 41 can run one or more programs, i.e. program instructions, stored in the memory unit, thus implementing the operations of the microcomputer 41 as software operations. As another example, the microcomputer 41 can include a specific hardware electronic circuit to implement the operations of the microcomputer 41 as hardware operations.

The integrated circuit 42 is comprised of, for example, a pre-driver, a signal amplifier, and a regulator. The pre-driver is operative to generate gate signals for the respective switches 21 to 26, 311, and 321 based on the control signals for the respective switches 21 to 26, 311, and 321. The pre-driver is also operative to output the generated gate signals to the gates of the respective switches 21 to 26, 311, and 321, thus individually controlling on-off switching operations of the switches 21 to 26, 311, and 321. The signal amplifier is operative to amplify the measurement signals sent from the torque sensor 94 and the rotation detector 45 and the voltage drops across the respective current sensing elements 27, 28, and 29, and output the amplified measurement signals and the amplified voltage drops to the microcomputer 41. The regulator is designed as a stabilization circuit that stabilizes an operating voltage supplied thereto from, for example, the battery 5.

The rotation detector 45 includes a sensor element, an analog-to-digital (A/D) converter, and a processor.

Each of the sensor element, A/D converter, and the processor operates in a predetermined operation period.

The sensor element is operative to measure a value of magnetic flux change caused by rotation of the sensor magnet 86. Then, the sensor element is operative to output an analog measurement signal indicative of the value of the magnetic flux change measured thereby. The A/D converter is operative to convert the analog measurement signal output from the sensor element into a digital measurement signal. The processor is operative to perform various tasks based on the digital measurement signal obtained by the A/D converter.

For example, the processor of the rotation detector 45 is operative to calculate, based on the measured value of the magnetic flux change included in the digital measurement signal, the rotation angle θm of the rotor 80b of the motor 80. The processor of the rotation detector 45 is operative to count, based on the value of the magnetic flux change included in the digital measurement signal, the number of rotation of the rotor 80b of the motor 80. The number of rotations of the rotor 80b of the motor 80 will be referred to as a rotation number TC of the motor 80. Then, the processor of the rotation detector 45 is operative to output, to the microcomputer 41, a rotational angle signal indicative of the rotation angle θm of the rotor 80b of the motor 80, and a rotation number signal indicative of the rotation number TC.

The regulator 46 is connected to the rotation detector 45, and designed as a stabilization circuit that stabilizes operating power supplied thereto from the battery 5. That is, the rotation detector 45 operates based on the operating power supplied from the regulator 46. The regulator 46 is a component different from the regulator installed in the integrated circuit 42. FIG. 2 illustrates that the regulator 46 is provided separately from the rotation detector 45, but the regulator 46 can be installed in the rotation detector 45.

In particular, the rotation detector 45 continuously counts the rotation number TC of the motor 80 even if the ignition switch IG is off. The control unit 40 is configured to calculate, based on the rotation number signal output from the rotation detector 45, a steering angle θs of the steering shaft 92.

The following describes how the control unit 40 calculates the steering angle θs of the steering shaft 92.

The microcomputer 41 of the control unit 40 has learned a neutral position of the steering wheel 91, and has stored in the memory unit thereof, the learned neutral position of the steering wheel 91. Note that the neutral position of the steering wheel 91 is defined as the position of the steering wheel 91 when the vehicle V incorporating therein the electronic power steering system 8 is travelling in a straight line at a constant speed for a predetermined time.

The microcomputer 41 calculates the steering angle θs of the steering shaft 92 relative to the neutral position of the steering wheel 91 as a function of the rotational angle θm, the rotation number TC, and the gear ratio of the deceleration gear mechanism 89. This configuration to calculate the steering angle θs of the steering shaft 92 enables steering sensors to be eliminated from the electronic power steering system 8.

While the electric power steering system 8 is shut down with the ignition switch IG being off, a driver's turning of the steering wheel 91 would turn the steering shaft 92 to turn the rotor 80b of the motor 80 via the deceleration gear mechanism 89. If the rotation number TC were not counted with the electric power steering system 8 being shut down, relearning of the neutral position of the steering wheel 91 would be needed. This would make it difficult for the microcomputer 41 to calculate the steering angle θs of the steering shaft 92 until relearning of the neutral position of the steering wheel 91 is completed.

From this viewpoint, the motor controller 10 according to the first embodiment is configured to continuously count the rotation number TC of the motor 80 while the electric power steering system 8 is shut down. This configuration enables the microcomputer 41 to calculate the steering angle θs of the steering shaft 92 without performing relearning of the neutral position of the steering wheel 91. Note that, because calculation of the steering angle θs of the steering shaft 92 requires an instantaneous value of the rotational angle θm at the restarting of the vehicle V, i.e. the restarting of the electric power steering system 8, it is unnecessary to continuously calculate the rotational angle θm while the electric power steering system 8 is shut down. This enables power consumption of the electric power steering system 8 to be kept at a lower level.

Specifically, the PIG line 51 is connected to the PIG terminal 71, so that DC power of the battery 5 is directly supplied to the PIG line 51 without via the ignition switch IG.

The motor controller 10 additionally includes first and second branch lines 52 and 53 connected to the PIG line 51, a regulator line 54, an IG line 55, a control-unit line 56, and a third branch line 57.

The first branch line 52 is connected to the PIG line 51 at the upstream of the relay unit 30. The second branch line 53 is connected to the PIG line 51 at the downstream of the relay unit 30. Each of the first and second branch lines 52 and 53 is connected to the regulator line 54, and the regulator line 54 is connected to the regulator 46.

The IG line 55 is connected to the IG terminal 72, so that DC power of the battery 5 is supplied to the IG line 55 via the ignition switch IG. The IG line 55 is connected to the second branch line 53 and the control-unit line 56. In addition, the third branch line 57 is branched from the second branch line 53, and connected to the control-unit line 56. The control-unit line 56 is connected to the control unit 40.

The diode 61 is mounted on the first branch line 52 to allow a current based on the battery 5 to flow therethrough. Specifically, the forward direction of the diode 61 is directed from the PIG line 51 to the connection point between the first branch line 52 and the regulator line 54.

The diode 62 is mounted on the second branch line 53 to be closer to the PIG line 51 than the connection point between the third branch line 57 and the second branch line 53 is. The diode 62 is arranged with its forward direction is directed from the PIG line 51 to the connection point between the third branch line 57 and the second branch line 53.

The diode 63 is mounted on the second branch line 53 to be farther to the PIG line 51 than the connection point between the IG line 55 and the second branch line 53 is. The diode 63 is arranged with its forward direction is directed from the PIG line 51 to the connection point between the second branch line 53 and the regulator line 54.

That is, each of the diodes 61 to 63 enables a current based on the battery 5 to flow therethrough, and disables a current toward the battery 5 from flowing therethrough.

The diode 64 is mounted on the IG line 55 to be closer to the ignition terminal 72 than the connection point between the ignition line 55 and the control-unit line 56 is. The diode 64 is arranged with its forward line being directed from the ignition terminal 72 to the connection point between the ignition line 55 and the control-unit line 56. That is, the diode 64 enables a current supplied from the ignition terminal 72 to flow therethrough, and disables a current toward the ignition terminal 72 from flowing therethrough.

This wiring configuration of the motor controller 10 enables DC power to be supplied from the battery 55 via one of a predetermined PIG path and a predetermined IG path while the ignition switch IG is on. The PIG path is comprised of the PIG terminal 71 and the PIG line 51, the second branch line 53 with the diode 62, the third branch line 57, and the control-unit line 56. The IG path is comprised of the IG terminal 72, the IG line 55 with the diode 64, and the control-unit line 56. That is, one of the PIG path and the IG path through which the DC power is supplied to the control unit 40 has a voltage higher than the other thereof. The diode 63 disables power being supplied via the first branch line 52 to the control unit 56.

This enables power supply to the control unit 40 to be stopped while the ignition switch IG is off.

This wiring configuration of the motor controller 10 also enables electrical power stored in the capacitor 35 to be supplied via the second branch line 53, the diode 62, the third branch line 57, and the control-unit line 56 to the control unit 40 while the reverse relay 32 is off.

This wiring arrangement of the motor controller 10 additionally enables DC power of the battery 5 to be supplied via the PIG line 51, the second branch line 53 with the diode 62, and the regulator line 54 to the regulator 46 independently of the on or off state of the ignition switch IG. This enables the rotation detector 45 to continuously perform at least part of its operations even if the ignition switch IG is off. This wiring configuration of the motor controller 10 further enables electrical power sored in the capacitor 35 to be supplied via the second branch line 53, the diodes 62 and 63, and the regulator line 54 to the regulator 46 even if the reverse relay 32 is off.

Specifically, the control unit 40 and the rotation detector 45 according to the first embodiment are each configured to constantly operate based on electrical power stored in the capacitor 35 even if the reverse relay 32 is off. The control unit 40 and the rotation detector 45 correspond to, for example, electronic components, i.e. electronic loads, according to the first embodiment. In particular, the diodes 61 and 64 disable electrical power stored in the capacitor 35 from being discharged from the capacitor 35 to the battery 5 via the IG line 55 or the PIG line 51 while the reverse relay 32 is off.

FIG. 1 illustrates that the electric power steering system 8 and at least one other device, such as the starter 4, installed in the vehicle V share the battery 5. An increase of power consumption by the at least one other device when the at least one other vehicle is driven, such as the starter being driven for start-up of the internal combustion engine, reduces the battery voltage Vb. This might result in the electric power steering system 8, which shares the battery 5 with the at least one other vehicle, failing to secure a voltage required to continuously operate, and all the operations of the electric power steering system 8 might be stopped.

As described above, the rotation detector 45 according to the first embodiment continuously counts the rotation number TC of the motor 80 even if the ignition switch IG is off in order to calculate the steering angle θs of the steering shaft 92 without using a steering-angle sensor. If a decrease in the battery voltage Vb resulted in difficulty for the rotation detector 45 to continuously count the rotation number TC, relearning of the neutral position of the steering wheel 91 would be needed. This would make it difficult for the control unit 40 to calculate the steering angle θs of the steering shaft 92 until relearning of the neutral position of the steering wheel 91 is completed. This would result in the steering angle θs of the steering shaft 92 being unstable.

From this viewpoint, even for the case of a decrease in the battery voltage Vb, the first embodiment as described above is configured to cause the electric power steering system 8 to continuously perform at least a part of its functions, such as a task of counting the rotation number TC, based on electrical power charged in the capacitor 35 while preventing the electrical charge stored in the capacitor 35 from being discharged to the battery 5. For example, this configuration of the first embodiment turns off the reverse relay 32 to prevent electrical charge stored in the capacitor 35 from being discharged from the capacitor 35.

Figure 3A:
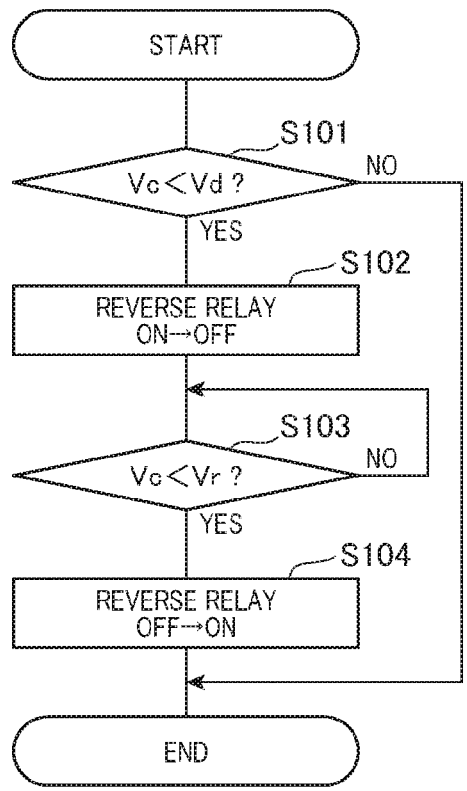
FIG. 3A is a flowchart schematically illustrating a relay control routine according to the first embodiment of the present disclosure.
Figure 3B:
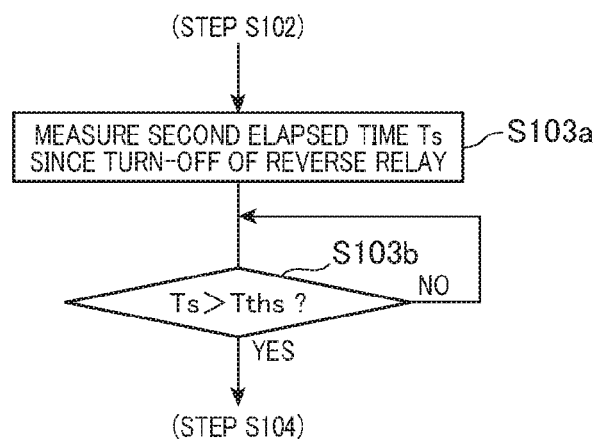
FIG. 3B is a flowchart schematically illustrating a modified relay control routine according to a modification of the first embodiment of the present disclosure.

The following describes a relay control routine periodically carried out by the microcomputer 41 while the electric power steering system 8 is powered with reference to FIG. 3A. That is, the ignition switch IG is on, so that the power supply 31 and the reverse relay 32 are on.

When starting the relay control routine, the microcomputer 41 determines whether the capacitor voltage Vc measured by the first voltage monitor 37 is lower than a predetermined determination threshold voltage Vd, which serves as, for example, a threshold voltage, in step S101. Upon determining that the capacitor voltage Vc is equal to or higher than the determination threshold voltage Vd (NO in step S101), the microcomputer 41 terminates the relay control routine.

Otherwise, upon determining that the capacitor voltage Vc is lower than the determination threshold voltage Vd (YES in step S101), the microcomputer 41 determines that the battery voltage Vb is in a predetermined low voltage state, i.e. a predetermined insufficient voltage state, for fully driving the electric power steering system 8. Then, the microcomputer 41 switches the reverse relay 32 from the on state to the off state in step S102. If the reverse relay 32 is in the off state, the microcomputer 41 keeps the reverse relay 32 in the off state in step S102.

Following step S102, the microcomputer 41 determines whether the capacitor voltage Vc is higher than a predetermined return threshold voltage Vr in step S103. Upon determining that the capacitor voltage Vc is equal to or lower than the return threshold voltage Vr (NO in step S103), the microcomputer 41 repeats the determination in step S102. Otherwise, upon determining that the capacitor voltage Vc is higher than the return threshold voltage Vr (YES in step S103), the microcomputer 41 determines that the battery voltage Vb has been returned to a normal voltage state. Then, the microcomputer 41 switches the reverse relay 32 from the off state to the on state in step S104, and thereafter, terminates the relay control routine.

Figure 4:
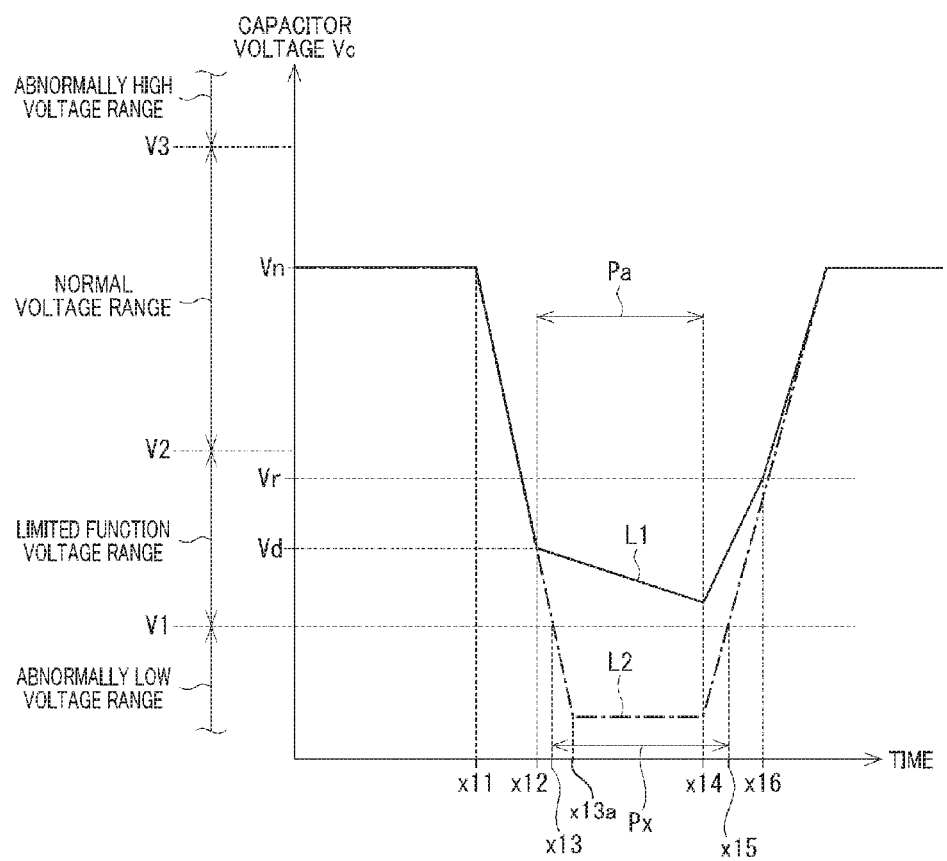
FIG. 4 is a timing chart schematically illustrating how a capacitor voltage changes over time depending on the switching state of a reverse relay illustrated in FIG. 2.

FIG. 4 schematically illustrates how the capacitor voltage Vc changes over time depending on the switching state of the reverse relay 32. FIG. 4 has the horizontal axis representing time, and has the vertical axis representing the capacitor voltage Vc.

In FIG. 4, solid line L1 shows how the capacitor voltage Vc changes over time while the relay control routine according to the first embodiment is carried out, and dot-and-dash line L2 shows how the capacitor voltage Vc changes over time while the reverse relay 32 is continuously kept on. In FIG. 4, reference characters V1, V2, and V3 respectively represent first, second, and third threshold voltages.

That is, the microcomputer 41 according to the first embodiment is configured to determine whether the capacitor voltage Vc, which serves as, for example, a power supply voltage for the electric power steering system 8, is lower than the first threshold voltage V1 or higher than the third threshold voltage V3.

Upon determining that the capacitor voltage Vc is lower than the first threshold voltage V1, the microcomputer 41 determines that the power supply voltage for the electric power steering system 8 is an abnormally low voltage, thus shutting down all the functions of the electrical power steering system 8. Similarly, upon determining that the capacitor voltage Vc is higher than the third threshold voltage V3, the microcomputer 41 determines that the power supply voltage for the electric power steering system 8 is an abnormally high voltage, thus shutting down all the functions of the electrical power steering system 8.

Otherwise, upon determining that the capacitor voltage Vc is equal to or higher than the first threshold voltage V1, or equal to or lower than the third threshold voltage V3, the microcomputer 41 determines that the electrical power steering system 8 is capable of performing at least part of all the functions. In particular, upon determining that the capacitor voltage Vc is equal to or higher than the second threshold voltage V2 and equal to or lower than the third threshold voltage V3, the microcomputer 41 determines that the electrical power steering system 8 is capable of operating normally, i.e. performing all the functions thereof. The range from the second threshold voltage V2 to the third threshold voltage V3 inclusive will be referred to as a normal voltage range.

Additionally, upon determining that the capacitor voltage Vc is equal to or higher than the first threshold voltage V1 and lower than the second threshold voltage V2, the microcomputer 41 determines that the electrical power steering system 8 is capable of performing only a predetermined part of all the functions thereof. In other words, the microcomputer 41 limits all the functions of the electrical power steering system 8 to predetermined functions. The range from the first threshold voltage V1 inclusive to the second threshold voltage V2 exclusive will be referred to as a limited function voltage range. The predetermined functions to be continuously executable by the electrical power steering system 8 even if the capacitor voltage Vc is within the limited function voltage range will be referred to as limited functions.

The limited functions according to the first embodiment include

1. Predetermined computing functions executed by the microcomputer 41
2. Predetermined communication functions executed by the microcomputer 41 with the other devices
3. The function by the rotation detector 45, which detects rotation of the rotor 80b of the motor 80.

Preferably, the rotation detector 45 is configured to limit all the functions thereof to a part of functions. Specifically, the rotation detector 45 according to the first embodiment is configured to continuously perform a function of continuously counting the rotation number TC without performing a function of detecting the rotational angle θm while the capacitor voltage Vc is within the limited function voltage range. The rotation detector 45 can be configured to continuously perform both the counting function and the detecting function while the capacitor voltage Vc is within the limited function voltage range.

In particular, the microcomputer 41 is configured not to perform on-off switching operations of the switches 21 to 26 of the inverter 21, thus maintaining the motor 80 in a non-operational state while the capacitor voltage Vc is within the limited function voltage range.

Referring to FIG. 4, before time x11, the power supply relay 31 and the reverse relay 32 are on, so that the capacitor voltage Vc is maintained to be equal to a value Vn of the battery voltage Vb when the capacitor voltage Vc, i.e. the battery voltage Vb, is within the normal voltage range.

Driving the starter 4 at the time x11 causes the battery voltage Vb to significantly decrease, because of the occurrence of a large starting current, i.e. an inrush current, to the starter 4 from the battery 5.

As illustrated by the dot-and-dash line L2, if the reverse relay 32 were kept on after the time x11, the capacitor voltage Vc would decrease with decrease of the battery voltage Vb, because the capacitor 35 would be discharged to the battery 5 via the reverse relay 32 and the power supply relay 31 due to decrease of the battery voltage Vb. This would cause the capacitor voltage Vc to fall to be lower than the first threshold voltage V1 after time x13.

If the large starting current stops at time x13a, the battery voltage Vb would be stable, so that the starter 4 would be driven based on, for example, a constant current supplied from the battery 5 (see the dot-and-dash line L2 after the time x13a). If the battery voltage Vb starts to increase at time x14 in response to stop of the starter 4, the capacitor voltage Vc would increase with increase of the battery voltage Vb, because an increase of the battery voltage Vb charges the capacitor 35 via the power supply relay 31 and the reverse relay 32. The example illustrated in FIG. 4 shows that the capacitor voltage Vc would be kept to be lower than the first threshold voltage V1 for the range from time x13 to time x15 while the revere relay 32 were kept on after the time x11. This therefore would make it difficult for the electrical power steering system 8 to continuously perform the limited functions. The range from the time x13 to the time x15 for which the electrical power steering system 8 could not continuously perform the limited functions will be referred to as a low voltage period Px.

If the control unit 40 and the rotation detector 45 were configured to operate for a longer voltage period including the low voltage period Px, the control unit 40 and the rotation detector 45 could continuously perform the corresponding limited functions with the capacitor voltage Vc being within the voltage period Px. This unfortunately would result in the electric power steering system 8 being more complicated and/or being higher in constructing cost.

From this viewpoint, the microcomputer 41 according to the first embodiment is configured to turn off the reverse relay 32 at the time x12 when the capacitor voltage Vc becomes to be lower than the determination threshold voltage Vd; the determination threshold voltage Vd that is set to be within the limited function voltage range. Specifically, the determination threshold voltage Vd is set to be higher than the first threshold voltage V1, and lower than the return threshold voltage Vr that is set to be lower than the second threshold voltage V2.

This prevents the capacitor 35 from being discharged to the battery 5 via the reverse relay 32. This limits the decrease of the capacitance voltage Vc as illustrated by the solid line L1 in comparison to the decrease of the capacitance voltage Vc as illustrated by the dot-and-dash line L2.

In particular, the capacitor 35 enables electrical power to be supplied therefrom to the control unit 40 and the rotation detector 45 even if the reverse relay 32 is off. This configuration enables the control unit 40 and the rotation detector 45 to continuously perform the corresponding limited functions based on the electrical power supplied from the capacitor 35.

In other words, preventing discharge from the capacitor 35 to the battery 5 results in the period for which the limited functions of the electric power steering system 8 are continuously executable being extended. The period from turn-off of the reverse relay 32 to the timing when the battery voltage Vb, which has decreased, starts to increase will be referred to as an extended period Pa.

Additionally, the diode 322 of the reverse relay 32 enables a current to flow therethrough from the upstream to the downstream thereof. This enables, when the battery voltage Vb, which has decreased, starts to increase at the time x14, DC power supplied from the battery 5 to charge the capacitor 35, resulting in the capacitor voltage 35 rising. Thus, when the capacitor voltage Vc becomes higher than the return threshold voltage Vr at time x16, the reverse relay 32 is turned on. Thereafter, when the capacitor voltage Vc becomes higher than the second threshold V2, this enables each of the microcomputer 41 and the rotation detector 45 to perform all the corresponding functions.

The microcomputer 41 of the electric power steering system 8 is configured to maintain the reverse relay 32 in the off state until the capacitor voltage Vc, which has dropped below the determination threshold voltage Vd, exceeds the return threshold voltage Vr. This configuration prevents electrical power charged in the capacitor 35 from flowing from the capacitor 35 to the battery 5. This enables the control unit 40 and the rotation detector 45 to continuously perform the corresponding limited functions including the function of counting the rotation number TC of the motor 80. This therefore enables the control unit 40 to continuously calculate the steering angle θs of the steering shaft 92 based on the rotation number TC of the motor 80 continuously counted by the rotation detector 45 even if the battery voltage Vb temporarily decreases due to driving of the starter 4.

As described above, the electric power steering system 8 according to the first embodiment includes the capacitor 35, the switch 321, and electronic components including, for example, the control unit 40 and the rotation detector 45. The capacitor 35 is connected to the battery 5, so that the capacitor 35 serves as a storage device in which DC power supplied from the battery 5 is charged. This configuration of the electric power steering system 8 has a simpler structure than another configuration of the power steering system 8 including an additional storage device.

The switch 321 is provided between the battery 5 and the capacitor 35. The control unit 40 causes the switch 321 to (1) Establish an electrical conduction path between the battery 5 and the capacitor 35 to cause the capacitor voltage Vc, which is the voltage across the capacitor 35, to follow the battery voltage Vb, which is the voltage across the battery 5

(2) Interrupt the electrical conduction path between the battery 5 and the capacitor 35

While the switch 321 is on, the capacitor 35 is charged based on DC power supplied from the battery 5. The electronic components are connected to the capacitor 35, and the capacitor 35 enables the DC power to be supplied to the electronic components after the switch 321 is turned off.

The microcomputer 41 of the control unit 40 controls turn-on operation, i.e. closing, of the switch 321 to establish the electrical conduction path between the battery 5 and the capacitor 35. The microcomputer 41 also controls turn-off operation, i.e. opening, of the switch 321 to interrupt the electrical conduction path therebetween.

The microcomputer 41 determines whether the battery voltage Vb is in the predetermined low voltage state, and turns off the switch 321 to interrupt the electrical conduction path between the battery 5 and the capacitor 35 upon determining that the battery voltage Vb is in the predetermined low voltage state.

This prevents electrical power charged in the capacitor 35 from being supplied to the battery 5 via the switch 321 when the battery voltage Vb is in the predetermined low voltage state due to, for example, driving of the starter 4 that shares the battery 5 together with the electric power steering system 8. This therefore restricts the rate of decrease of the battery voltage Vb, and enables the electrical power charged in the capacitor 35 to be supplied to the electronic components. This enables the electronic components, which include the control unit 40 and the rotation detector 45, to continuously perform at least some of all the corresponding functions.

The microcomputer 41 determines that the battery voltage Vb is in the predetermined low voltage state when the capacitor voltage Vc becomes lower than the determination voltage threshold Vd (see YES in step S101). Because the capacitor voltage Vc follows the battery voltage Vb while the switch 32 is on, the microcomputer 41 easily determines, based on the capacitance voltage Vc, whether the battery voltage Vb is in the predetermined low voltage state.

The microcomputer 41 turns on the switch 32 when the battery voltage Vb returns to be out of the predetermined low voltage state, i.e. returns to be in a predetermined normal voltage state, i.e. sufficient voltage state. This enables the electronic components to perform all functions thereof.

The electric power steering system 8 includes the diode 322 connected in parallel to the switch 321 with its forward direction being directed from the battery 5 to the capacitor 35. That is, the diode 322 enables a current to flow therethrough from the battery 5 to the capacitor 35. The diode 322 enables the capacitor 35 to be charged based on the DC power from the battery 5 whose voltage Vb is equal to or higher than the predetermined battery threshold voltage even if the switch 321 is off.

The microcomputer 41 determines that the battery voltage Vb is out of the predetermined low voltage state when the capacitor voltage Vc becomes higher than the return threshold voltage Vr (see step S103). This enables the microcomputer 41 to properly determine, based on the capacitor voltage Vc, whether the battery voltage Vb is out of the predetermined low voltage state.

The control unit 40 is operative to control the motor 80 for outputting assist torque that assists the driver's steering effort of the steering wheel 91. The electric power steering system 8 according to the first embodiment is configured to turn off the reverse relay 32 when the battery voltage Vb is in the predetermined low voltage state to thereby prevent electrical power charged in the capacitor 35 from being discharged to the battery 5. This enables the electronic components to perform corresponding limited functions even if the battery voltage Vb temporarily decreases to be in the predetermined low voltage state.

In particular, the electric power steering system 8 includes the rotation detector 45 for measuring rotational information about the motor 80, which is used to calculate the steering angle θs of the steering shaft 92. The rotational information includes the rotation number TC of the motor 80. That is, the control unit 40 calculates the steering angle θs of the steering shaft 92. This enables steering sensors to be eliminated from the electronic power steering system 8.

As described above, the electronic components include the rotation detector 45. Specifically, the rotation detector 45 is configured to be powered based on the electrical power stored in the capacitor 35 when the battery voltage Vb is in the predetermined low voltage state. This enables the rotation detector 45 to continuously count the rotation number TC even if the battery voltage Vb temporarily falls to be in the predetermined low voltage state. This therefore enables the control unit 40 to continuously calculate the steering angle θs of the steering shaft 92 based on the counted rotation number TC without relearning the neutral position of the steering wheel 91.

Additionally, the electronic components include the control unit 40. Specifically, the control unit 40 is configured to be powered based on the electrical power stored in the capacitor 35 when the battery voltage Vb is in the predetermined low voltage state. This enables the control unit 40 to continuously perform the corresponding limited functions even if the battery voltage Vb temporarily falls to be in the predetermined low voltage state.

Second Embodiment

Figure 5:
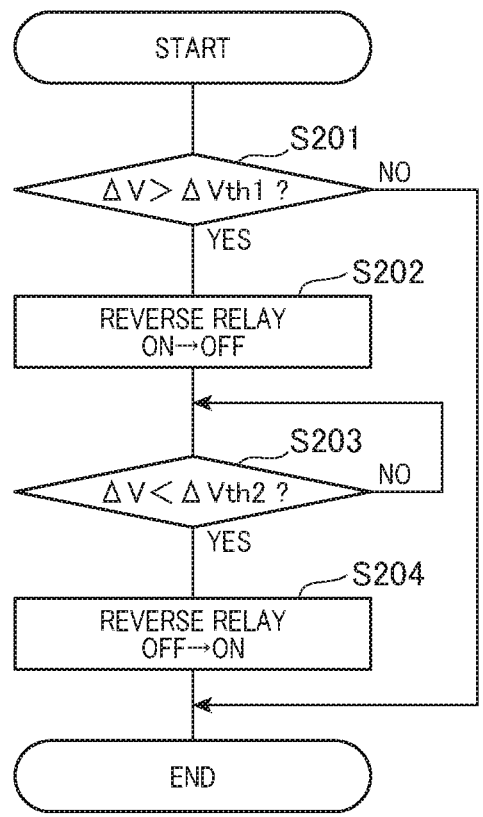
FIG. 5 is a flowchart schematically illustrating a relay control routine according to the second embodiment of the present disclosure.
Figure 6:
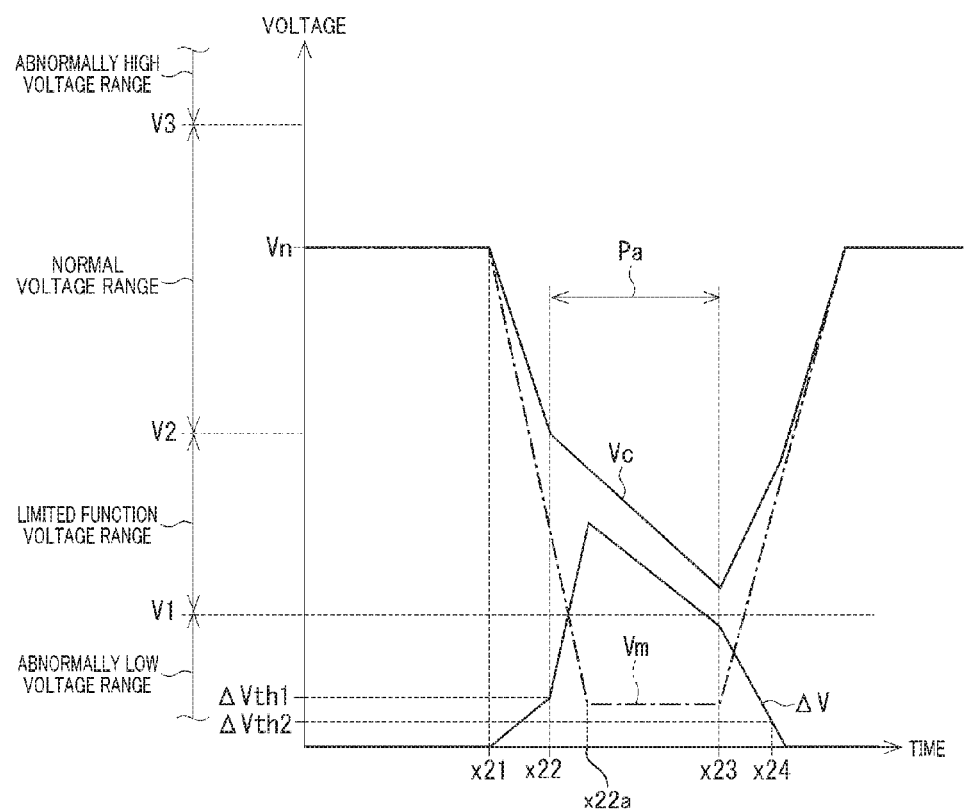
FIG. 6 is a timing chart schematically illustrating how a voltage deviation, the capacitor voltage, and an intermediate voltage change over time depending on the switching state of the reverse relay according to the second embodiment.

The following describes the second embodiment of the present disclosure with reference to FIGS. 5 and 6. The electric power steering system according to the second embodiment differs in a relay control routine from the electric power steering system according to the first embodiment. So, the following mainly describes the relay control routine carried out by the microcomputer 41 according to the second embodiment, and omits or simplifies descriptions of like parts between the first and second embodiments, to which identical or like reference characters are assigned, thus eliminating redundant description.

The following describes the relay control routine according to the second embodiment, which is periodically carried out by the microcomputer 41 while the electric power steering system 8 is powered with reference to FIG. 5. That is, the ignition switch IG is on, so that the power supply 31 and the reverse relay 32 are on.

When starting the relay control routine, the microcomputer 41 subtracts the intermediate voltage Vm from the capacitor voltage Vc to obtain a voltage deviation ΔV in accordance with the following equation (1) in step S201:

$$\Delta V = Vc - Vm \quad (1)$$

Then, in step S201, the microcomputer 41 determines whether the voltage deviation ΔV is higher than a predetermined deviation determination threshold ΔVth1, which serves as, for example, a predetermined deviation threshold. Upon determining that the voltage deviation ΔV is equal to or lower than the deviation determination threshold ΔVth1 (NO in step S201), the microcomputer 41 terminates the relay control routine.

Otherwise, upon determining that the voltage deviation ΔV is higher than the deviation determination threshold ΔVth1 (YES in step S201), the microcomputer 41 determines that the battery voltage Vb is in the predetermined low voltage state. Then, the relay control routine proceeds to step S202.

In step S202, the microcomputer 41 switches the reverse relay 32 from the on state to the off state. If the reverse relay 32 is in the off state, the microcomputer 41 keeps the reverse relay 32 in the off state in step S202.

Following step S202, the microcomputer 41 determines whether the voltage deviation ΔV is lower than a predetermined return determination threshold ΔVth2 in step S203. The return determination threshold ΔVth2 is set to be lower than the deviation determination threshold ΔVth1.

Upon determining that the voltage deviation ΔV is equal to or higher than the return determination threshold ΔVth2 (NO in step S203), the microcomputer 41 repeats the determination in step S203. Otherwise, upon determining that the voltage deviation ΔV is lower than the return determination threshold ΔVth2 (YES in step S203), the microcomputer 41 determines that the battery voltage Vb has been returned in the normal voltage state. Then, the microcomputer 41 switches the reverse relay 32 from the off state to the on state in step S204, and thereafter, terminates the relay control routine.

FIG. 6 schematically illustrates how the voltage deviation ΔV, the capacitor voltage Vc, and the intermediate voltage Vm change over time depending on the switching state of the reverse relay 32. FIG. 6 has the horizontal axis representing time, and has the vertical axis representing voltage.

Referring to FIG. 6, before time x21, the power supply relay 31 and the reverse relay 32 are on, so that the capacitor voltage Vc and the intermediate voltage Vm are maintained to be equal to the value Vn of the battery voltage Vb when the capacitor voltage Vc, i.e. the battery voltage Vb, is within the normal voltage range.

Driving the starter 4 at the time x21 causes the battery voltage Vb to significantly decrease, because of the occurrence of a large starting current to the starter 4 from the battery 5. This causes the capacitor voltage Vc and the intermediate voltage Vm to decrease with decrease of the battery voltage Vb. In particular, because the decrease rate of the intermediate voltage Vm is faster than the decrease rate of the capacitor voltage Vc, the voltage deviation ΔV becomes higher over time.

When the voltage deviation ΔV exceeds the deviation determination threshold ΔVth1 at time x22, the reverse relay 32 is turned off. The turn-off of the reverse relay 32 at the time x22. This prevents the capacitor 35 from being discharged to the battery 5 via the reverse relay 3232. This limits the decrease rate of the capacitance voltage Vc (see the solid curve of the capacitance voltage Vc illustrated in FIG. 6), which is similar to the first embodiment. The capacitor 35 enables electrical power to be supplied therefrom to the control unit 40 and the rotation detector 45 even if the reverse relay 32 is off. This configuration enables the control unit 40 and the rotation detector 45 to continuously perform the corresponding limited functions based on the electrical power supplied from the capacitor 35.

In contrast, the intermediate voltage Vm continuously decreases with decrease of the battery voltage Vb although the reverse relay 32 has been off, because the intermediate voltage Vb represents the potential at the point located upstream of the reverse relay 32.

After stop of the large starting current at time x22a, the battery voltage Vb and the intermediate voltage Vm are stable, so that the starter 4 is operating based on, for example, a constant current supplied from the battery 5 (see the dot-and-dash curve of the intermediate voltage Vm after the time x22a). When the battery voltage Vb starts to increase at time x23 in response to stop of the starter 4, the capacitor voltage Vc and the intermediate voltage Vm increase with increase of the battery voltage Vb, because an increase of the battery voltage Vb charges the capacitor 35 via the power supply relay 31 and the reverse relay 32.

On the other hand, the voltage deviation ΔV increases with its increase rate being faster after the reverse relay 32 is turned off at the time x22, because the decrease rate of the capacitor voltage Vc is limited. Thereafter, the voltage deviation ΔV shifts to decrease at the time x22a when the intermediate voltage Vm is stable. When the battery voltage Vb shifts to increase at the time x23, the decrease rate of the voltage deviation ΔV becomes faster. When the voltage deviation ΔV becomes lower than the return determination threshold ΔVth2 at time x24, the reverse relay 32 is turned on.

As described above, the control unit 40 of the electric power steering system 8 according to the second embodiment is configured to control on-off switching operations of the reverse relay 32 based on the voltage deviation ΔV, which is the capacitor voltage Vc minus the intermediate voltage Vm. The intermediate voltage Vm represents the potential at a point located upstream of the reverse relay 32, and the capacitor voltage Vc across the capacitor 35 located downstream of the reverse relay 32. In particular, the control unit 40 turns off the reverse relay 32 when there is a predetermined level of the difference in voltage between the upstream and downstream of the reverse relay 32. This immediately prevents the capacitor 35 from being discharged therefrom to the battery 5.

Specifically, the control unit 40 determines that the battery voltage Vb is in the predetermined low voltage state, i.e. the predetermined insufficient voltage state, when the voltage deviation ΔV is higher than the deviation determination threshold ΔVth1 (YES in step S201). This configuration enables the control unit 40 to determine that the battery voltage Vb is in the predetermined low voltage state, thus more properly preventing the electrical power stored in the capacitor 35 from being discharged therefrom to the battery 5.

The control unit 40 determines that the battery voltage Vb has returned to be out of the predetermined low voltage state to turn on the switch 32 when the voltage deviation ΔV is lower than the return determination threshold ΔVth2 (YES in step S203). That is, the control unit 40 determines whether the battery voltage Vb has returned to be out of the predetermined low voltage state based on the voltage deviation ΔV. This enables the end of the period for which the battery voltage Vb is in the predetermined low voltage state to be immediately determined.

Additionally, the electric power steering system 8 according to the second embodiment achieves substantially similar advantageous effects to the advantageous effects achieved by the first embodiment.

Third Embodiment

The following describes the third embodiment of the present disclosure with reference to FIGS. 7 and 8. The electric power steering system according to the third embodiment differs in a relay control routine from the electric power steering system according to the first embodiment. So, the following mainly describes the relay control routine carried out by the microcomputer 41 according to the third embodiment, and omits or simplifies descriptions of like parts between the first and third embodiments, to which identical or like reference characters are assigned, thus eliminating redundant description.

The following describes the relay control routine according to the third embodiment, which is carried out by the microcomputer 41 each time the ignition switch IG is switched from the off state to the on state while the power supply relay 31 and the reverse relay 32 are in the off state, with reference to FIG. 7.

In step S300, the microcomputer 41, which operates based on the DC power supplied from the battery 5 via the IG terminal 72, measures an elapsed time Tig that has elapsed since turn-on of the ignition switch IG. Next, the microcomputer 41 executes an initial check routine, i.e. initial check program, to perform an initial check task in response to turn-on of the ignition switch IG in step S301.

In step S301, the microcomputer 41 for example performs, as the initial check task, checking whether there is a power supply fault, a ground fault, a break fault, or an open fault in the circuit of the electric power steering system 8. A power supply fault for example represents that a part of the circuit of the electric power steering system 8 is short-circuited to the positive terminal of the battery 5. A ground fault for example represents that a part of the circuit of the electric power steering system 8 is short-circuited to the common signal ground of the electric power steering system 8 or a frame ground of the vehicle V. A circuit brake fault represents that at least part of the circuit of the electric power steering system 8 has been broken. An open fault represents that a part of the circuit of the electric power steering system 8 has opened so that no current flows through the part of the circuit of the electric power steering system 8.

For example, the microcomputer 41 measures voltages and/or currents at predetermined points of the circuit of the electric power steering system 8, and determines whether there is a power supply fault, a ground fault, or a break fault in the circuit of the electric power steering system 8 in step S302.

Upon determining that the initial check task has not been completed (NO in step S302), the microcomputer 41 repeats the determination in step S302. Otherwise, it is determined that the initial check task has been completed (YES in step S302), the relay control routine proceeds to step S303.

In step S303, the microcomputer 41 determines whether to activate the electric power steering system 8 in accordance with the results of the initial checking. Upon determining not to activate the electric power steering system 8 (NO in step S303), the microcomputer 41 terminates the relay control task.

Otherwise, upon determining to activate the electric power steering system 8 (YES in step S303), the microcomputer 41 performs the following operation in step S304.

Specifically, in step S304, the microcomputer 41 turns on or holds on the power supply relay 31, and turns off or holds off the reverse relay 32. Then, the microcomputer 41 determines whether the elapsed time Tig has reached a predetermined determination threshold time Tth in step S305. The determination threshold time Tth can be determined based on time required for the internal combustion engine to have completely started.

Upon determining that the elapsed time Tig has not reached the predetermined determination threshold time Tth (NO in step S305), the microcomputer 41 determines that the battery voltage Vb is assumed to be in the predetermined low voltage state. Then, the microcomputer 41 repeats the determination in step S305.

Otherwise, upon determining that the elapsed time Tig has reached the predetermined determination threshold time Tth (YES in step S305), the microcomputer 41 determines that the starter 4 is deactivated, so that the battery voltage Vb is assumed to have shifted from the predetermined low voltage state into the predetermined normal voltage state, i.e. sufficient voltage state. Then, the microcomputer 41 executes the following operation in step S306.

In step S306, the microcomputer 41 switches the reverse relay 32 from the off state to the on state, and thereafter, terminates the relay control routine.

FIGS. 8A to 8D are a joint timing chart schematically illustrating an example of how the electric power steering system 8 operates while the microcomputer 41 executes the relay control routine according to the third embodiment. Each of FIGS. 8A to 8D has the horizontal axis representing time. The vertical axis of FIG. 8A represents how the state of the ignition switch IG is changed over time, and the vertical axis of FIG. 8B represents how the state of the electric power steering system 8 is changed over time. The vertical axis of FIG. 8C represents how the state of the power supply relay 31 is changed over time, and the vertical axis of FIG. 8D represents how the state of the reverse relay 32 is changed over time. FIGS. 8A to 8D represents a case where there are no power supply faults, no ground faults, and no break faults in the circuit of the electric power steering system 8.

Referring to FIG. 8, before time x31, the ignition switch IG, the power supply relay 31, and the reverse relay 32 are off.

The microcomputer 41 starts the initial check task in response to turn-on of the ignition switch IG at the time x31. That is, the microcomputer 41 executes on-off switching operations of the power supply relay 31 and the reverse relay 32 in accordance with instructions of the initial check routine. In particular, the initial check routine according to the third embodiment is programed to temporarily turn on the reverse relay 32 for checking, for example, whether there is an open fault in the circuit of the electric power steering system 8, and to maintain the revere switch 32 in the off state except for the temporary turn-on periods.

Upon determining that the initial check task has been completed at time x32 (YES in step S302), the microcomputer 41 turns on or holds on the power supply relay 31. This enables the electric power steering system 8 to operate normally.

In response to turn-on of the ignition switch IG, the starter 4 is operating to start the internal combustion engine. This may cause the battery voltage Vb to temporarily decrease.

From this viewpoint, the microcomputer 41 according to the third embodiment holds the reverse relay 32 in the off state at the time x32 when the initial check task is terminated. Then, when the determination threshold time Tth has elapsed at time x33 since turn-on of the ignition switch IG at the time x31, the microcomputer 41 determines that the internal combustion engine has reliably started so that the starter 4 has been reliably deactivated. Thus, at the time x33, the microcomputer 41 turns on the reverse relay 32.

This configuration prevents the electrical power stored in the capacitor 35 from being discharged from the capacitor 35 to the battery 5. This enables the control unit 40 and the rotation detector 45 to perform the corresponding limited functions even if the battery voltage Vb temporarily decreases to be in the predetermined low voltage state.

In particular, the configuration enables the rotation detector 45 to perform the counting of the rotation number TC as its limited functions even if the battery voltage Vb temporarily decreases to be in the predetermined low voltage state. This enables the control unit 40 to continuously calculate the steering angle θs of the steering shaft 92 without relearning the neutral position of the steering wheel 91 even if the battery voltage Vb temporarily decreases to be in the predetermined low voltage state.

The control unit 40 determines whether the battery voltage Vb is in the predetermined low voltage state based on the operating condition of the at least one other device, such as the starter 4, which shares the battery 5 with the electric power steering system 8.

In particular, the control unit 40 determines whether the battery voltage Vb is in the predetermined low voltage state based on a parameter that is associated with change of the battery voltage Vb.

For example, upon determining that the starter 4 is operating, the control unit 40 determines that the battery voltage Vb is in the predetermined low voltage state (see step S304).

In addition, upon determining that the starter 4 is not operating because the determination threshold time has elapsed since turn-on of the ignition switch IG, the control unit 40 determines that the battery voltage Vb is out of the predetermined low voltage state (see step S305).

This configuration eliminates the need to monitor the capacitor voltage Vc and the intermediate voltage Vm, and therefore results in simpler control of switching the reverse relay 32 between the on state, i.e. close state, and the off state, i.e. open state.

Additionally, the electric power steering system 8 according to the third embodiment achieves substantially similar advantageous effects to the advantageous effects achieved by the first embodiment.

Fourth Embodiment

The following describes the fourth embodiment of the present disclosure with reference to FIG. 9. The electric power steering system according to the fourth embodiment differs in a relay control routine from the electric power steering system according to the first embodiment. So, the following mainly describes the relay control routine carried out by the microcomputer 41 according to the fourth embodiment, and omits or simplifies descriptions of like parts between the first and fourth embodiments, to which identical or like reference characters are assigned, thus eliminating redundant description.

The following describes the relay control routine according to the fourth embodiment, which is periodically carried out by the microcomputer 41 while the electric power steering system 8 is powered with reference to FIG. 9. That is, the ignition switch IG is on, so that the power supply 31 and the reverse relay 32 are on.

When starting the relay control routine, the microcomputer 41 determines whether a voltage-reduction operating mode has been started in step S401. The voltage-reduction operating mode represents an operating mode of an engine controller EC, which is communicable with the microcomputer 41, to drive the starter 4. For example, the microcomputer 41 communicates with the engine controller EC via the communication terminal 75 to receive, from the engine controller EC, mode start information indicative of the start of the voltage-reduction operating mode via the communication terminal 75 in step S401. Then, the microcomputer 41 determines, based on the mode start information received from the engine controller EC, whether the voltage-reduction operating mode has been started in step S401.

Upon determining that the voltage-reduction operating mode has not been started (NO in step S401), the microcomputer 41 terminates the relay control routine.

Otherwise, upon determining that the voltage-reduction operating mode has been started (YES in step S401), the microcomputer 41 determines that the battery voltage Vb is in the predetermined low voltage state. Then, the relay control routine proceeds to step S402.

In step S402, the microcomputer 41 switches the reverse relay 32 from the on state to the off state. If the reverse relay 32 is in the off state, the microcomputer 41 keeps the reverse relay 32 in the off state in step S402.

Following step S402, the microcomputer 41 determines whether the voltage-reduction operating mode has been terminated in step S403. For example, the microcomputer 41 communicates with the engine controller EC via the communication terminal 75 to receive, from the engine controller EC, mode end information indicative of the end of the voltage-reduction operating mode via the communication terminal 75 in step S403. Then, the microcomputer 41 determines, based on the mode end information received from the engine controller EC, whether the voltage-reduction operating mode has been terminated in step S403.

Upon determining that the voltage-reduction operating mode has not been terminated (NO in step S403), the microcomputer 41 repeats the determination in step S403.

Otherwise, upon determining that the voltage-reduction operating mode has been terminated (YES in step S403), the microcomputer 41 determines that the battery voltage Vb has been returned in the normal voltage state. Then, the microcomputer 41 switches the reverse relay 32 from the off state to the on state in step S404, and thereafter, terminates the relay control routine.

As described above, the control unit 40 of the electric power steering system 8 according to the fourth embodiment is configured to control on-off switching operations of the reverse relay 32 based on information received from the engine controller EC via the communication terminal 75. This configuration eliminates the need to monitor the capacitor voltage Vc and the intermediate voltage Vm, and therefore results in simpler control of switching the reverse relay 32 between the on state, i.e. close state, and the off state, i.e. open state.

When the engine controller EC drives the starter 4 for restarting the internal combustion engine, which has been stopped in an idle reduction state, the battery voltage Vb may temporarily decrease.

From this viewpoint, the microcomputer 41 according to the fourth embodiment turns off the reverse relay 32 in response to the drive of the starter 4. This configuration prevents the electrical power stored in the capacitor 35 from being discharged from the capacitor 35 to the battery 5. This enables the control unit 40 and the rotation detector 45 to perform the corresponding limited functions even if the battery voltage Vb temporarily decreases to be in the predetermined low voltage state.

Additionally, the electric power steering system 8 according to the fourth embodiment achieves substantially similar advantageous effects to the advantageous effects achieved by the first embodiment.

Modifications

The present disclosure is not limited to the above described embodiments, and can be variably modified within the scope of the present disclosure.

The microcomputer 41 according to the first embodiment can be modified to execute the determination in step S203 in place of the determination in step S103, thus determining whether the voltage deviation $\Delta V$ is lower than the return determination threshold $\Delta V$th2 (see in step S203).

Similarly, the microcomputer 41 according to the first embodiment can be modified to execute the determination in step S403 in place of the determination in step S103, thus determining whether the voltage-reduction operating mode has been terminated (see step S403).

Additionally, the microcomputer 41 according to the second embodiment can be modified to execute the determination in step S103 or the determination in step S403 in place of the determination in step S203. Similarly, the microcomputer 41 according to the fourth embodiment can be modified to execute the determination in step S103 or the determination in step S203 in place of the determination in step S403.

The microcomputer 41 according to the third embodiment can be modified to execute the determination in step S103, the determination in step S203, or the determination in step S403 in place of the determination in step S305.

The microcomputer 41 according to each of the first, second, and fourth embodiments can be configured not to perform the determination in corresponding one of steps S103, S203, and S403, and to 1. Measure second elapsed time Ts that has elapsed since turn-off of the reverse relay 32 (see, for example, step S103a of FIG. 3B)
2. Determine whether the second elapsed time Ts has exceeded a predetermined second determination threshold time Tths (see for example step S103b of FIG. 3B)
3. Turn on the reverse relay 32 upon determining that the second elapsed time Ts has exceeded the second determination threshold time Tths (see for example step S104).

The microcomputer 41 according to each of the first, second, and fourth embodiments can be configured not to perform the determination in corresponding one of steps S103, S203, and S403, and to perform the operation in step S305 set forth above.

Specifically, the microcomputer 41 according to each of the first to fourth embodiments can be configured to determine whether the battery voltage Vb is in the low voltage state in accordance with a parameter that is associated with change of the battery voltage Vb.

The intermediate voltage Vm at the point on the PIG line 51, which is located between the power supply relay 31 and the reverse relay 32, is used as an example of an upstream voltage at the upstream of the reverse relay 32, but the present disclosure is not limited thereto. Specifically, the upstream voltage can be a potential at any point on the PIG line 51 between the PIG terminal 71 and the reverse relay 32.

The electric power steering system 8 according to each of the first to fourth embodiments includes the capacitor 35 serving as an example of a power storage device, but the present disclosure is not limited thereto.

Specifically, the electric power steering system 8 according to each of the first to fourth embodiments can be modified to include, in addition to the battery 5 as a main battery, a chargeable and dischargeable device, such as another battery serving as a sub battery.

Each of the first to fourth embodiments uses MOSFETs as the respective switches 21 to 26, 311, and 312, but can use other types of switches, such as IGBTs or thyristors as the respective switches 21 to 26, 311, and 312.

Intrinsic diodes or external diodes can be used as the diodes of the respective switches 21 to 26, 311, and 312. The diode 322 of the reverse relay 32 can be eliminated. In this modification, the capacitor voltage Vc does not increase until the reverse relay 32 is turned on. For this reason, the microcomputer 41 according to each of the first to fourth embodiments can be modified to execute the determination in step S305, S403, or S103b, thus determining whether the battery voltage Vb is out of the predetermined low voltage state.

The electric power steering system 8 according to each of the first to fourth embodiments uses the power supply relay 31 and the reverse relay 32, but the power supply relay 31 can be eliminated in the electric power steering system 8.

The electric power steering system 8 according to each of the first to fourth embodiments serves as a battery system for installation in vehicles. The electric power steering system 8 includes the control unit 40 and the rotation detector 45. The control unit 40 and the rotation detector 45 are included in the electronic components that are chargeable based on the capacitor 35 serving as a power storage device while the reverse relay 32 is in the off state. The electronic components may optionally not include at least one of the control unit 40 and the rotation detector 45, or can include other devices in addition to the control unit 40 and the rotation detector 45.

The control unit 40 of each embodiment is configured to calculate the steering angle θs of the steering shaft 92 based on the rotational information about the motor 80. The control unit 40 of each embodiment can be modified to eliminate the counting of the rotation number TC of the motor 80 as long as (1) A steering sensor is provided to measure the steering angle θs of the steering shaft 92

(2) The control unit 40 is configured to relearn the neutral position of the steering wheel 91.

Each of the first to fourth embodiments includes the corresponding electric power steering system 8 as an example of a battery-sharing system. Each of the first to fourth embodiments can be modified to include another vehicular system including a plurality of devices that share a battery. In each of the first to fourth embodiments, the electronic power steering apparatus 8 shares the battery 5 with the starter 4, but can share the battery 5 with another external device.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A system that shares a battery with an external device, the system comprising:
    a power storage device connected to the battery via a power supply line;
    a switch provided on the power supply line; and
    a control unit configured to control on-off switching operations of the switch to selectively establish an electrical conduction between the battery and the power storage device or interrupt the electrical conduction therebetween, the battery having a battery voltage thereacross, the power storage having a power-storage voltage thereacross, the battery charging the power storage device while the electrical conduction is established so that the power-storage voltage follows the battery voltage,
    the control unit being configured to turn off the switch when the battery voltage is in a predetermined insufficient voltage state to prevent electrical power charged in the power storage device from being discharged to the battery.

2. The system according to claim 1, wherein:
    the control unit is configured to:
        determine whether the power-storage voltage is lower than a predetermined threshold voltage; and
        determine that the battery voltage is in the predetermined insufficient voltage state upon determining that the power-storage voltage is lower than the predetermined threshold voltage.

3. The system according to claim 1, wherein:
    the control unit is configured to:
        obtain an upstream voltage at a predetermined point on the power supply line, the predetermined point being upstream of the switch;
        subtract, from the power-storage voltage, the upstream voltage to obtain a voltage deviation;
        determine whether the voltage deviation is higher than a predetermined deviation threshold; and
        determine that the battery voltage is in the predetermined insufficient voltage state upon determining that the voltage deviation is higher than the predetermined deviation threshold.

4. The system according to claim 1, wherein:
    the control unit is communicably connected to the external device, and is configured to:
        communicate with the external device to obtain information indicative of an operating condition of the external device; and
        determine whether the battery voltage is in the predetermined insufficient voltage state based on the obtained information.

5. The system according to claim 1, wherein:
    the system is installed in a vehicle equipped with an internal combustion engine and a starter for starting the internal combustion engine, the external device including the starter; and
    the control unit is communicably connected to the starter, and is configured to:
        communicate with the external device to obtain information indicative of the operating condition of the starter;
        determine whether the starter is operating based on the obtained information; and
        determine that the battery voltage is in the predetermined insufficient voltage state when determining that the starter is operating.

6. The system according to claim 1, wherein:
    the control unit is configured to turn on the switch when the battery voltage is out of the predetermined insufficient voltage state.

7. The system according to claim 1, further comprising:
    a diode connected in parallel to the switch with a forward direction thereof being directed toward the power storage device, so that the battery charges the power storage device via the diode even if the switch is in an off state,
    wherein the control unit is configured to:
        determine whether the power-storage voltage is higher than a predetermined return threshold voltage; and
        determine that the battery voltage is out of the predetermined insufficient voltage state upon determining that the power-storage voltage is higher than the predetermined return threshold voltage.

8. The system according to claim 1, further comprising:
    a diode connected in parallel to the switch with a forward direction thereof being directed toward the power storage device, so that the battery charges the power storage device via the diode even if the switch is in an off state,
    wherein the control unit is configured to:
        obtain an upstream voltage at a predetermined point on the power supply line, the predetermined point being upstream of the switch;
        subtract, from the power-storage voltage, the upstream voltage to obtain a voltage deviation;
        determine whether the voltage deviation is lower than a predetermined return deviation threshold; and
        determine that the battery voltage is out of the predetermined insufficient voltage state upon determining that the voltage deviation is lower than the predetermined return deviation threshold.

9. The system according to claim 1, wherein the power storage device comprises a capacitor.

10. The system according to claim 1, wherein:

the system is installed in a vehicle equipped with a steering shaft, a a steering wheel mounted to the steering shaft, and a motor for assisting a driver's steering effort of the steering wheel; and the control unit is configured to control the motor.

11. The system according to claim 1, further comprising:

a rotation detector configured to detect rotation information indicative of rotation of the motor; and the control unit is configured to calculate, based on the rotation information, a rotational angle of the steering shaft as a steering angle.

12. The system according to claim 11, wherein:

the power storage device enables the electrical power to be supplied to the rotation detector while the switch is in an off state;

the rotation detector is configured to detect, as part of the rotation information, the number of rotations of the motor; and the control unit is configured to calculate, based on the number of rotation of the motor, the steering angle of the steering shaft.

13. The system according to claim 11, wherein:

the power storage device enables the electrical power to be supplied to the control unit while the switch is in an off state.

* * * * *